United States Patent [19]

Watts

[11] Patent Number: 5,011,166
[45] Date of Patent: Apr. 30, 1991

[54] MECHANICAL FACE SEALS

[75] Inventor: Christopher J. Watts, Slough, United Kingdom

[73] Assignee: John Crane UK Limited, United Kingdom

[21] Appl. No.: 509,018

[22] Filed: Apr. 13, 1990

[30] Foreign Application Priority Data

Apr. 24, 1989 [GB] United Kingdom ............... 8909289

[51] Int. Cl.⁵ .............................................. F16J 15/36
[52] U.S. Cl. ...................................... 277/88; 277/89; 277/93 R; 277/935 D
[58] Field of Search ............ 277/89, 90, 93 R, 93 SD, 277/200, 212 FB, 88; 267/122

[56] References Cited

U.S. PATENT DOCUMENTS

| | | | |
|---|---|---|---|
| 2,978,264 | 4/1961 | Campbell | 277/88 |
| 3,122,375 | 2/1964 | Greenwald | 277/88 |
| 3,336,034 | 8/1967 | Smith | 277/88 |
| 3,977,465 | 8/1976 | Tank | 277/88 X |
| 4,114,904 | 9/1978 | Wenthworth, Jr. | 88/277 |
| 4,121,843 | 10/1978 | Halling | 277/200 |
| 4,376,540 | 3/1983 | Kotzur et al. | 277/88 X |
| 4,378,119 | 3/1983 | Luxford et al. | 277/93 SD X |
| 4,477,088 | 10/1984 | Picard | 277/88 X |
| 4,744,569 | 5/1988 | Wentworth, Jr. | 277/88 |

FOREIGN PATENT DOCUMENTS

| | | | |
|---|---|---|---|
| 2031530 | 4/1980 | United Kingdom | 277/212 |
| 2839336 | 9/1978 | Fed. Rep. of Germany | |
| 3129113 | 7/1981 | Fed. Rep. of Germany | |
| 3639482 | 11/1986 | Fed. Rep. of Germany | |

*Primary Examiner*—William A. Cuchlinski, Jr.
*Assistant Examiner*—J. Folker
*Attorney, Agent, or Firm*—Davis, Bujold & Streck

[57] ABSTRACT

A mechanical face seal includes a seal face member which is secured in fixed rotational relationship and sealed with respect to one component by means of a resilient bellows unit, said bellows unit being attached at one end to the associated component and at the other end to the seal face member, the seal face member being biased into sealing engagement with a second seal face member by compression of the bellows unit, the bellows unit defining a plurality of convolutions, a convolution in a portion of the bellows unit subject to higher stressing having a pitch which is greater than and/or a depth which is less than that of a convolution in a portion of the bellows unit subject to lower stressing, thereby evening out the stress distribution in the bellows unit when in operation.

15 Claims, 2 Drawing Sheets

MECHANICAL FACE SEALS

BACKGROUND TO THE INVENTION

The present invention relates to mechanical face seals and in particular to mechanical face seals in which one seal face member is secured in fixed rotational relationship and sealed with respect to one of a pair of relatively rotatable components so that it is movable axially with respect thereto, by means of a resilient bellows unit.

With seals of this type, when the bellows unit fails due to fatigue, this normally occurs at the convolution adjacent the end by which it is rigidly secured to the associated component. Stressing of the bellows unit results from three effects:

a) axial compression of the bellows unit by means of which an axial load is applied to the seal face member urging it into sealing engagement with a second seal face member associated with the other component;

b) loading due to the pressure differential across the bellows unit; and c) vibrational loading.

The end of the bellows unit which is rigidly secured to the associated component, must support the rest of the bellows unit and is not flexibly mounted in the same way as the other convolutions and will consequently be more highly stressed, particularly with regard to vibrational loading. Stressing of the other end of the bellows unit, which is attached to the seal face member or a carrier ring for the seal face member, could also be above average.

The present invention provides a bellows unit in which stresses are more evenly distributed.

SUMMARY OF THE INVENTION

According to one aspect of the present invention, a mechanical face seal includes a seal face member which is secured in fixed rotational relationship and sealed with respect to one of a pair of relatively rotatable components by means of a resilient bellows unit, said bellows unit being attached at one end to the associated component and at the other end to the seal face member, the seal face member being biassed into sealing engagement with a second seal face member associated with the other component by compression of the bellows unit, the bellows unit defining a plurality of convolutions, each convolution having a pitch which is the axial separation between a point on one convolution and a corresponding point on the next convolution and a depth which is the radial separation between the extremity of the crown and the extremity of the root of the convolution, wherein at least one of the pitch and depth of the convolutions differs along the length of the bellows.

According to one embodiment of the present invention, the pitch of the convolutions may be greater in portions of the bellows unit subject to higher stressing than in portions of the bellows unit subject to lower stressing. Alternatively, the pitch of the convolutions may remain constant while the depth of the convolutions is reduced in portions of the bellows unit subject to higher stressing. A combination of variation in pitch and depth may also be used to tailor the bellows unit to operating conditions, increasing the pitch to depth ratio in portions subjected to higher stressing and lowering the pitch to depth ratio in portions of the bellows unit subjected to lower stressing. Preferably, variation of pitch and/or depth of the convolutions will be progressive from one portion to another.

The present invention is applicable to welded bellows units in which a series of annular disks are welded together, alternate pairs of disks being welded together at their inner and outer peripheries, or to formed bellows units in which a thin walled tube is deformed to define a series of convolutions.

BRIEF DESCRIPTION OF THE DRAWINGS

Various embodiments of the invention are now described, by way of example only, with reference to the accompanying drawings in which.

DESCRIPTION OF A PREFERRED EMBODIMENT

Figure 1:
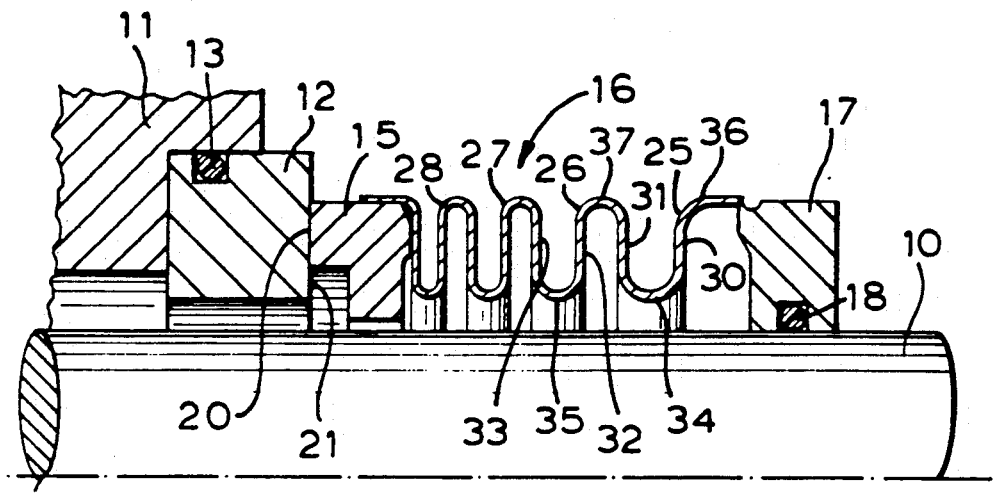
FIG. 1 shows in sectional elevation a seal formed in accordance with the present invention.

As illustrated in FIG. 1, a mechanical face seal between a rotary shaft 10 and housing 11, includes a first seal face member or seat 12 which is retained in fixed rotational relationship in a recess in the housing 11 and is sealed with respect thereto by means of an elastomeric O-ring 13.

A seal face member 15 is mounted with respect to the shaft 10 for rotation therewith but movable axially thereof, by means of a metal bellows unit 16. The metal bellows unit 16 is secured to a collar 17 mounted upon the shaft 10 in fixed axial and rotational relationship thereto, in known manner. The collar 17 is sealed with respect to the shaft by means of elastomeric O-ring 18. The bellows unit 16 is secured to the collar 17 in fluid tight manner by, for example, welding, brazing, bonding with an adhesive or swaging. The seal face member 15 is a press fit within the end of bellows unit 16 remote from collar 17 and is sealed with respect thereto.

Under normal operation, the bellows unit 16 is held under compression so that a sealing face 20 of the seal face member 15 is urged into sealing engagement with face 21 of seat 12.

Figure 2:
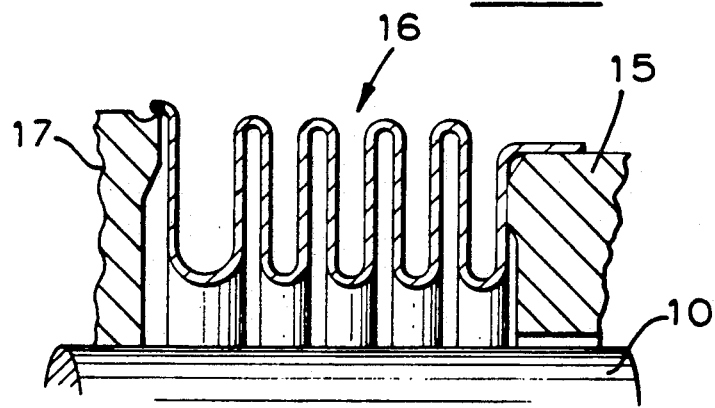
FIG. 2 shows a modification to the bellows unit used in the seal illustrated in FIG. 1.

The metal bellows unit 16 comprises a series of convolutions 25 to 28 all of equal depth. The pitch of the convolutions 25 to 28 reduce with their spacing from the end of the bellows unit 16 which is secured to the collar 17. Typically, if convolution 25 has a pitch P, convolution 26 could have a pitch $P \times F$ where F is a reduction factor which is less than 1. Convolution 27 could then have a pitch $P \times F^2$ and so on. Other relationships may be used for example the pitch of each convolution may be a function of the pitch of the proceeding convolution. Furthermore variation in pitch may be limited to only part of the bellows unit 16, for example to a single convolution at the end of the bellows unit 16 connected to collar 17, as illustrated in FIG. 2. The bellows unit illustrated in this figure also incorporates the asymmetrical configuration covered by UK Patent GB 2082693B.

The most highly stressed areas of the bellows unit 16 described above will be the crowns and roots of the convolutions 25 to 28. The greater the radius of the crowns and roots the stronger and thus more capable of withstanding the stresses they will be. Stressing of the bellows unit 16 illustrated in FIG. 1 will result from three factors:

a) Axial compression of the bellows unit; this will tend to close up the convolutions thus reducing the radius of the crowns and roots. This reduction in the radius will have a greater effect on the convolutions with smaller radii and will consequently be felt more towards the end of the bellows unit remote from the collar 17.

b) Pressure differential across the bellows unit; this acts to force apart the walls of the convolutions open to high pressure, for example, in the seal illustrated in FIG. 1, if high pressure acts between the bellows unit 16 and housing 11, the pressure will force walls 30 and 31 of convolution 25 and walls 32 and 33 of convolution 26 apart This will increase the radius of the roots 34 and 35 of convolutions 25 and 26 respectively thus reducing stressing of those areas. However, the radius of the crowns 36 and 37 will be reduced thus increasing stressing. Again this factor will have a greater effect the smaller the radius of the crowns, that is the further the convolution is away from the collar 17.

c) Vibrational loading; this has greatest effect at the end of the bellows unit 16 which is secured to collar 17, this end supporting the rest of the bellows unit 16, the effect diminishing away from the end secured to the collar 17.

Because of the configuration of the bellows unit 16 used in the seal described above, the higher stressing of the convolutions 25 and 26 adjacent the collar due to vibrational stresses, will be balanced against the reduced loading due to axial compression and pressure differential, so that the bellows unit may be more evenly stressed than a conventional bellows unit with symmetrical configuration. The bellows unit 16 may consequently be capable of taking greater overall stress levels without failure and still provide sufficiently low face on-load for the unit to produce a seal while avoiding high wear rates.

The bellows design is a compromise between strength and spring rate, it being necessary to provide the required strength while maintaining a spring rate sufficiently low, so that the bellows unit may be compressed to an extent which will allow movement of the seal face member 15 as the sealing faces 20 and 21 wear, without producing an excessive axial load which would result in a high wear rate and heat production which may lead to seal failure. Reduction of the strength of the material used to form the bellows unit 16 will help in this respect. The spring rate will also depend upon the number of convolutions and consequently reducing the pitch of the convolutions away from the collar 17 thereby increasing the number of convolutions will also lower the spring rate.

Figure 3:
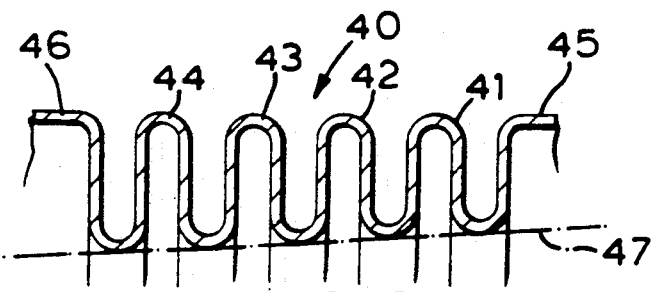
FIG. 3 shows an alternative form of bellows unit which may be used in the seal illustrated in FIG. 1.
Figure 4:
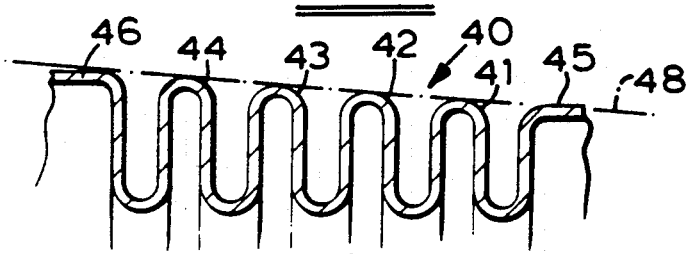
FIG. 4 is a variation of the bellows unit shown in FIG. 3.
Figure 5:
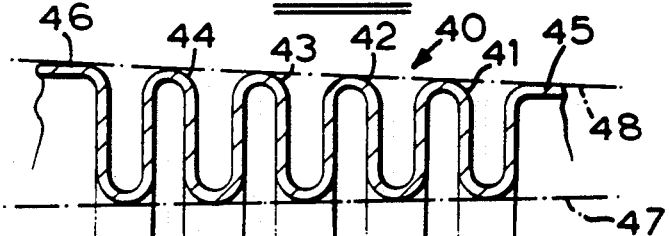
FIG. 5 is an alternative variation of the bellows unit illustrated in FIG. 3.

In the alternative form of bellows unit 40 illustrated in FIGS. 3, 4 and 5, the pitch of the convolutions 41 to 44 remains constant but the depth of the convolutions increases from the end 45 of the bellows unit 40 which is secured to collar 17, to the end 46 to which the seal face member 15 is fitted. Typically, if the depth of convolution 41 is Cd then the depth of convolution 42 could be Cd/F where F is the depth factor which is less than 1. The depth of convolution 43 could then be $Cd/F^2$ and so on.

With the bellows unit 40, stress loading due to compression of the bellows which will decrease the radius of the crowns and roots of the convolutions will be substantially uniform. However, stress loading due to the shorter flanks and the axially stiffer convolutions will balance the higher stressing due to vibrational loading. The longer flanks towards end 46 are subject to less vibrational stresses, being in effect flexibly mounted, so this extra capacity is used to bring the overall bellows stiffness back down and maintain sufficiently low face load due to compression, within the limits of pressure capacity.

The depth of the convolutions 41 to 44 of bellows unit 40 may be varied by varying the internal diameter 47 of the convolutions as illustrated in FIG. 3, the external diameter 48 as illustrated in FIG. 4, or both the internal and external diameters 47 and 48 as illustrated in FIG. 5. The balance diameter of the bellows unit, that is the diameter on which the axial on-load due to pressure applied by the bellows unit 40 effectively acts on the seal face member 15, may be varied as required, in this manner.

Figure 6:
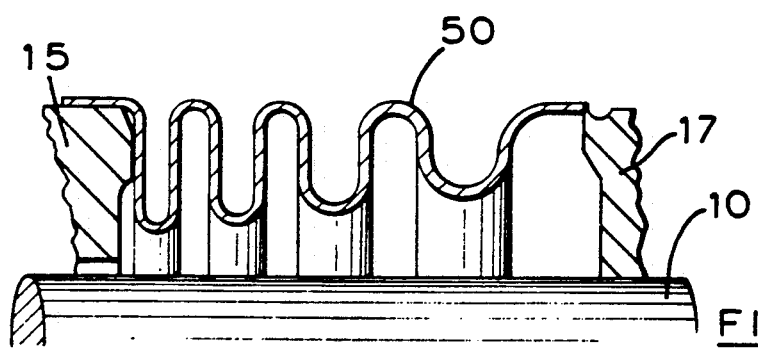
FIG. 6 illustrates a further alternative form of bellows unit which may be used in a seal according to the present invention.

As illustrated in FIG. 6, a combination of increase in the pitch and decrease in the depth of the convolutions towards the end of the bellows unit 50 which is attached to collar 17, may be used in order to reduce stressing in that portion of the bellows unit 50, as described above.

Figure 7:
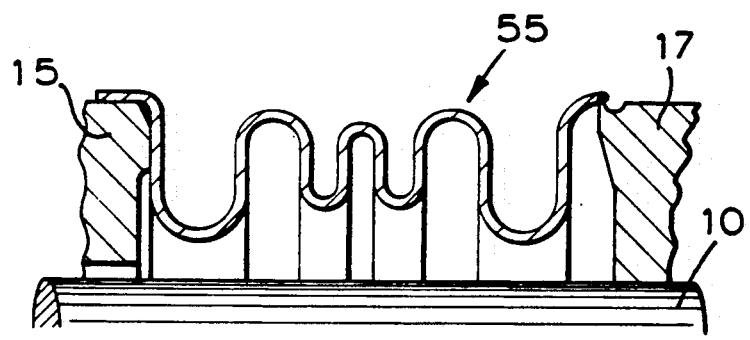
FIG. 7 illustrates a variation of the bellows unit illustrated in FIG. 6.

Alternatively, as illustrated in FIG. 7 the bellows unit 55 may be tailored to provide substantially uniform stressing throughout its length, under operating conditions. This may be achieved by increasing the pitch of the convolutions in the more highly stressed end portions of the bellows unit 55 while reducing the depth of the convolutions in the less stressed central portion, provided that the overall effect is to reduce stressing in the more highly stressed portions of the bellows unit 55. Similarly the depth of the convolutions may be reduced in the more highly stressed portions of the bellows unit, while the pitch is increased in the less stressed portions, provided that overall levelling of the stresses is achieved. Generally this may be achieved by increasing the pitch to depth ratio in the more highly stressed portions of the bellows unit.

While the most highly stressed portion of the bellows unit 55 will be that end portion secured to the shaft 10 by collar 17, the end portion attached to seal face member 15 is also liable to be more highly stressed than the central portion of the bellows unit 55, due to reaction of the seal face member 15 against seat 12. The pitch of the convolutions may consequently be increased and/or the depth of the convolutions decreased towards both ends of the bellows unit 55, as illustrated in FIG. 7.

Figure 8:
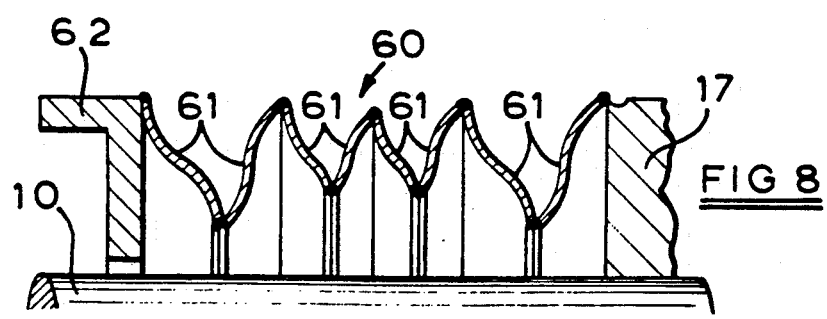
FIG. 8 illustrates a welded bellows unit similar to the bellows unit illustrated in FIG. 7.

As illustrated in FIG. 8, the bellows unit 60 may be a welded bellows unit formed from a series of annular disks 61, alternate pairs of disks 61 being welded together at their inner and outer peripheries, to provide a series of convolutions. As described above, the pitch and/or depth of the convolutions may be varied, to even out stressing along the length of the bellows unit 60. In the embodiment illustrated in FIG. 8 a retaining ring 62 for seal face member 15, is welded to the end of the bellows unit 60 remote from collar 17.

The various relationships between the pitches and depths of the convolutions given above are given by way of example only and other relationships may be used. While only one configuration of welded bellows unit is shown, configurations of welded bellows units corresponding to any of the embodiments illustrated in FIGS. 1 to 5 are also covered by the present invention.

I claim:

1. A mechanical face seal including a seal face member which is secured in fixed rotational relationship and sealed with respect to one of a pair of relatively rotatable components by means of a resilient bellows unit, said bellows unit being attached at one end to the associated component and at the other end to the seal face member, the seal face member being biased into sealing engagement with a second seal face member associated with the other component by compression of the bellows unit, the bellows unit defining a plurality of convolutions, each convolution having a pitch which is the axial separation between a point on one convolution and a corresponding point on the next convolution and a depth which is the radial separation between the extremity of the crown and the extremity of the root of the convolution, wherein at least one of the pitch and depth of the convolutions differs along the length of the bellows.

2. A mechanical face seal according to claim 1 in which the pitch to depth ratio of the convolutions in a portion of the bellows unit subject to higher stressing is greater than that in a portion of the bellows unit subject to lower stressing.

3. A mechanical face seal according to claim 1 in which the pitch of the convolutions is greater in portions of the bellows unit subject to higher stressing than in portions of the bellows unit subject to lower stressing.

4. A mechanical face seal according to claim 1 in which both the pitch and depth of the convolutions are varied so that the pitch to depth ratio is greater in portions of the bellows unit subject to higher stressing than in portions of the bellows unit subject to lower stressing.

5. A mechanical face seal according to claim 1 in which the seal face member is secured to its associated component by means of a resilient formed bellows unit.

6. A mechanical face seal according to claim 1 in which the seal face member is secured to its associated component by means of a welded bellows unit.

7. A mechanical face seal according to claim 1 in which the pitch of the convolutions is greater towards the end of the bellows unit attached to the component associated therewith.

8. A mechanical face seal according to claim 1 in which the depth of the convolutions is less towards the end of the bellows unit attached to the component associated therewith.

9. A mechanical face seal according to claim 1 in which the pitch of the convolutions is greater towards the end of the bellows unit to which the seal face member is attached.

10. A mechanical face seal according to claim 1 in which the depth of the convolutions is less towards the end of the bellows unit to which the seal face member is attached.

11. A mechanical face seal including a seal face member which is secured in fixed rotational relationship and sealed with respect to one of a pair of relatively rotatable components by means of a resilient bellows unit, said bellows unit being attached at one end to the associated component and at the other end to the seal face member, the seal face member being biased into sealing engagement with a second seal face member associated with the other component by compression of the bellows unit, the bellows unit defining a plurality of convolutions, each convolution having a pitch which is the axial separation between a point on one convolution and a corresponding point on the next convolution and a depth which is the radial separation between the extremity of the crown and the extremity of the root of the convolution, wherein at least one of the pitch and depth of the convolutions differs along the length of the bellows and the depth of the convolutions is less in portions of the bellow unit subject to higher stressing than in portions of the bellows unit subject to lower stressing.

12. A mechanical face seal according to claim 11 in which the depth of the convolutions is varied by varying the internal diameters of the convolutions.

13. A mechanical face seal according to claim 11 in which the depth of the convolutions is varied by varying the external diameter of the convolutions.

14. A mechanical face seal according to claim 11 in which the depth of the convolutions is varied by varying both the internal and external diameters of the convolutions.

15. A mechanical face seal including a seal face member which is secured in fixed rotational relationship and sealed with respect to one of a pair of relatively rotatable components by means of a resilient bellows unit, said bellows unit being attached at one end to the associated component and at the other end to the seal face member, the seal face member being biased into sealing engagement with a second seal face member associated with the other component by compression of the bellows unit, the bellows unit defining a plurality of convolutions, each convolution having a pitch which is the axial separation between a point on one convolution and a corresponding point on the next convolution and a depth which is the radial separation between the extremity of the crown and the extremity of the root of the convolution, wherein at least one of the pitch and depth of the convolutions differs along the length of the bellows and variation in at least one of the pitch and depth of the convolutions is progressive from a portion of the bellows unit subject to higher stressing to a portion of the bellows unit subject to lower stressing.

* * * * *